United States Patent Office 2,983,738
Patented May 9, 1961

2,983,738

POLYOXYALKYLATED ALIPHATIC NITRILES AND AMINES AND METHOD

Russell J. Stenberg, St. Paul, Minn., assignor to Archer-Daniels-Midland Company, Minneapolis, Minn., a corporation of Delaware No Drawing. Filed Oct. 30, 1957, Ser. No. 693,271

11 Claims. (Cl. 260—404)

This invention relates to propionitrile derivatives of long chain fatty acid, half-esters of polyoxyalkylated glycols, the amines derived therefrom and the process of preparing the same. In particular, the invention concerns the preparation of polyoxyalkylated fatty acid nitrile and amine products by reacting a fatty acid of 6 to 24 carbon atoms with an alkylene oxide to form the half ester of a poly alkoxy glycol followed by reaction with acrylonitrile to form the nitrile from which the referred amines are prepared.

Illustratively, the invention relates to the preparation of nitriles and amines having the general formulae:

A.
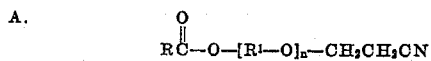

and

B.
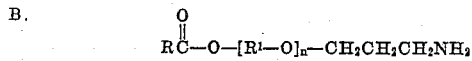

where R is a straight or branched, saturated or unsaturated aliphatic radical of from 5 to 23 carbon atoms, and the group —R¹O— is a polyoxyalkylated group in which R¹ is ethylene, propylene, butylene and/or mixtures of same, and $n$ is an integer greater than 1. The group

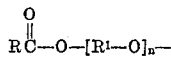

is defined as the half fatty acid ester of a polyoxyalkylated glycol or a poly alkoxylated fatty acid.

Accordingly, it is an object of this invention to provide nitriles obtained by cyanoethylation of polyoxyalkylated fatty acids and amines by hydrogenation of these nitriles.

Another object of this invention is to provide compounds containing an ester group and oxyalkyl groups in combination with a nitrile group which compound has the general formula:

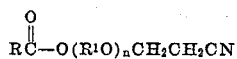

where $n$ is an integer varying from 2 to 30, R is a straight or branch chain saturated or unsaturated aliphatic radical containing from 5 to 23 carbon atoms, R¹ is a short chain aliphatic alkyl group of 2, 3 or 4 carbon atoms, or mixtures of alkylene groups.

An additional object of this invention is to provide fatty acid derived compounds containing an ester group with a plurality of short chain oxyalkyl groups and a primary amine group of the general formula:

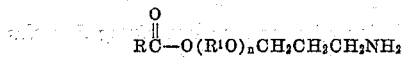

where $n$, R and R¹ are the same as defined in the paragraph above.

A further object is to provide a method for the preparation of the compounds formed by the reaction of polyethoxylated fatty acids and acrylonitrile with hydrogenation of these acrylonitrile adducts to produce polyethoxylated amine compounds.

In general, the defined compounds are prepared in the manner generally indicated in the following reactions:

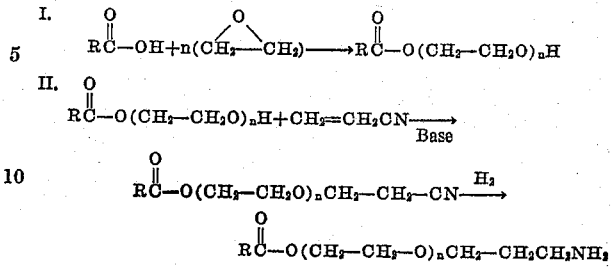

where

is a straight or branched chain saturated or unsaturated aliphatic faty acid radical or from 5 to 24 carbon atoms, i.e., extending from capryl to tetracosanyl, and $n$ is an integer varying from 2 to 30.

In the case of poly propoxylated derivatives the structure of

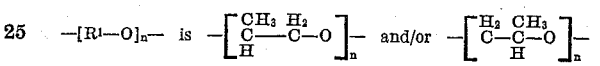

The polyoxyalkylated or specifically the polyethoxylated fatty acid of reaction I, can be prepared by any one of the processes known to the art for reacting a short chain alkylene oxide with a compound containing an active hydrogen, fatty acids in this invention, with the aid of a basic catalyst. In the case of mixed alkoxy compounds, the several oxides are reacted consecutively and/or alternately rather than simultaneously with the fatty acids. It is not the intent of this invention to claim such polyoxyalkylated derivatives, rather than their structure adds valuable properties to the products herein described. The oxides used are those of ethylene, propylene, 1,2-butylene, 2,3-butylene, and isobutylene.

The fatty acids which are polyoxyalkylated are of vegetable, marine and animal origin obtained from linseed, soybean, safflower, tall, peanut, cottonseed, corn, walnut, rapeseed, castor, menhaden, sardine, cod, pilchard, shark, whale and sperm oils, lard and hydrogenated and various grades of tallow, all of which furnish the basic acid constituents, of the non-conjugated character defined by

above and as herein disclosed.

The polyoxyalkylated fatty acid, or specifically the polyethoxylated fatty acid of reaction II, is reacted further with acrylonitrile in the presence of a strong base to form the propionitrile derivatives. In general, the limiting conditions for preparation of the polyoxyalkyl fatty acid nitriles are indicated, as follows:

The acrylonitrile may be varied from a chemically equivalent amount to 200% in excess of the equivalent of polyoxyalkyl acid. The preferred excess is 100%.

(1) The catalyst may vary from 0.05 to 1.5 gram of sodium per mole of the polyoxyalkyl acid. The preferred amount of catalyst being 0.4 gram per mole of the polyoxyalkyl acid. Strong bases other than sodium such as the hydroxide or oxides of the alkali metals and the quaternary ammonium bases, may also be used in this reaction. The amount of the latter catalyst may vary from 0.01 gram to 5 grams per mole of the polyoxyalkylated fatty acid, with the preferred range being from 0.1 gram to 1.0 gram. After the reaction is completed, the catalyst is neutralized by the addition of a chemically equivalent amount of strong acid, e.g. hydrochloric acid.

(2) An inert solvent may be used in the cyanoethylation reaction. The preferred are the aromatics, such an benzene, toluene or xylene, varying from none at all to 500% based on the weight of the polyoxyalkyl acid. Preferably the solvent is used in an amount of 100% or in amounts at least equivalent in weight to the portion of the reactants.

(3) The cyanoethylation reaction is carried out at any temperature where the reaction mixture is fluid and below the acrylonitrile reflux temperature in the given mixture, i.e. below 77° C. The preferred temperature is 30° C. to 40° C. during addition of acrylonitrile and 50° C. to 60° C. during the heating period for completion of the reaction after the addition.

(4) The time for addition of acrylonitrile to the polyoxyalkoxyalkylated acids may vary from being added all at once or to a slow addition. The slow addition up to a period of about 1 hour is desirable with the period from ¼ to ½ hour time of addition being preferred. The reaction time is determined by the particular reactants and as indicated for the materials herein illustrated may range from 1 to several hours.

The conversion of the polyoxyalkylated fatty acid acrylonitrile derivative to the corresponding amine, shown in reaction II can be effected by conventional reduction procedures and catalysts. The latter can be the noble metals, cobalt, nickel, and the like. Raney nickel is preferred. In general, in the hydrogenation of the acrylonitrile adducts, the amount of Raney nickel catalyst may range from 0.1% to 10% by weight based on the adduct, with the preferred range being 2 to 5%. The reaction may be carried on with or without solvents. It is preferred to use inert solvents such an benzene, toluene, and the like in an amount at least equal to the weight of the nitrile adduct and up to 10 times the weight of the nitrile adduct if desired. About 1 to 2 times the weight of solvent to the weight of the nitrile adduct is sufficient.

Ammonia is used with hydrogen during the reduction reaction to prevent formation of secondary amines and increase the yield of primary amines. No particular time of reaction can be set forth as this is governed by the rate of hydrogenation which in turn is governed by the temperature, catalyst concentration and nature of the nitrile being hydrogenated.

The most suitable temperature range falls between about 50° C. to about 150° C. with the preferred temperature being around 100° C. The total hydrogen and ammonia pressure may vary from 200 to about 5000 p.s.i. with the preferred pressure being about 1000 to about 1500 p.s.i.

Illustrative specific non-limiting examples of fatty acid products, defined under Formula A above, are as follows:

EXAMPLE I

*Polyethoxylated acrylonitrile adduct of soya acids*

To 261 parts of polyethoxylated soya acids having an average of 5.5 ethylene oxide units dissolved in 150 parts of benzene was added 0.2 parts of sodium dissolved in 5 parts of ethanol. Then 62 parts of acrylonitrile were added dropwise to the stirred mixture over a period of 25 minutes as the temperature rose from 28° C. to 48° C. The temperature was held at 50° C. for another hour. The reaction mixture was neutralized with concentrated hydrochloric acid, filtered, and stripped of solvent and unreacted acrylonitrile. The product contained 2.86% N (calculated, 2.43) and 0.40% OH (original, 3.31) and had an acid value of 2.12.

EXAMPLE II

*Polyethoxylated acrylonitrile adduct of tall oil acids*

To 621 parts (0.86 mole) of polyethoxylated tall oil acids having an average of 12 ethylene oxide units dissolved in 621 parts of benzene were added 0.23 part of sodium dissolved in 4.6 parts of ethanol. As the resulting solution was stirred at 35° to 40° C., 80 parts (1.5 mole) of acrylonitrile were added dropwise over a period of 50 minutes. Then the temperature was raised to 52–55° C. After 17 hours of reaction, the mixture was neutralized with concentrated sulfuric acid, filtered and stripped of solvent and unreacted acrylonitrile. Analysis of the product: acid value, 0.82; percent OH, 0.27 (original, 2.37); and percent N, 1.7 (calculated, 1.81). On the basis of the hydroxyl content, 89% of the ethoxylated acids had been converted to the acrylonitrile adduct.

EXAMPLE III

*Polyethoxylated acrylonitrile adduct of a mixture of stearic acid and palmitic acid*

A polyethoxylated mixture of stearic and palmitic acids containing an average of 12 ethylene oxide units per mole of acid was cyanoethylated in the same way as in the preceding examples. Quantities used: ethoxylated acids, 600 parts; (0.83 mole), benzene, 600 parts; sodium, 0.225 part in 4.5 parts of ethanol; and acrylonitrile, 80 parts (1.5 mole). Reaction conditions: 30 minutes for addition of acrylonitrile at 42° C.; 16.5 hours at 50–60° C. after addition of acrylonitrile. Analysis of product: percent N, 1.28 (calculated, 1.80); percent OH, 0.78 (original, 2.35); and acid value, 0.89.

Since the hydroxyl value indicated about 67% conversion to the cyanoethylated product, it was subjected to further cyanoethylation. Quantities used: partially cyanoethylated product, 560 parts; benzene, 560 parts; sodium, 0.528 part in 10.56 parts ethanol (0.205 part to neutralize acid and 0.323 part as catalyst); acrylonitrile, 65.8 parts. Reaction conditions: 35 minutes for addition of acrylonitrile at 43–45° C. and 18.5 hours at 50–60° C. after addition of the acrylonitrile. Analysis of the product: percent N, 2.03 (calculated, 1.80); percent OH, 0.26; acid value, 1.32. The OH analysis indicated 89% conversion to the cyanoethylated product. The nitrogen analysis indicated that some beta-ethoxy propionitrile probably was in the product.

EXAMPLE IV

*Cyanoethylation of linseed acid adduct of mixed propylene and ethylene oxides*

To 250 parts polyoxyalkylated linseed oil having an average of 5 ethylene oxide units and 5 propylene oxide units dissolved in 250 parts toluene was added 0.253 part sodium dissolved in 4.6 parts ethyl alcohol. To this mixture was slowly added over a period of about 20 minutes, 44.1 parts acrylonitrile, while the temperature was maintained at between 24.5° C. and 29° C. The acrylonitrile was added in an amount somewhat over 100% excess. The mixture was made up in a reactor equipped with a mechanical stirrer, temperature control and a water cooled condenser. After addition of the acrylonitrile, the mixture was held at 50° C. for a period of 13 hours. The mixture was cooled and the sodium ethylate in the reaction mixture was neutralized by a small excess of concentrated hydrochloric acid. The reaction mixture was then filtered and stripped of toluene and traces of water under a vacuum of 1 mm. at a temperature of about 115° to 125° C. The product analysed 1.62% nitrogen (1.66 theoretical), 1.02% OH (original 3.36) and an acid value of 4.2.

EXAMPLE V

*Cyanoethylation of soya acid containing 5 moles propylene oxide*

To 250 parts propoxylated soya acid dissolved in an equal proportion of toluene was added 0.349 part sodium dissolved in 9.2 parts ethyl alcohol. Then 67.46 parts acrylonitrile was added dropwise to the stirred mixture over a period of about an hour with the temperature held between 25° C. and 33° C. The temperature was held at 50° C. for a period of 11¾ hours to complete the reaction. The reaction mixture was neutralized with concentrated hydrochloric acid (36%), filtered and stripped of solvent and traces of water and unreacted acrylonitrile in the manner as indicated in Example IV. The product analyzed 1.20% nitrogen, 0.27% OH and an acid value of 0.56.

Having illustrated the above process for obtaining the intermediate products of this disclosure, it is preferred that they can be converted to amines of the character as illustrated by Formula B above. Such amine products and their matter of production are illustrated as follows:

EXAMPLE VI

*Amine of polyethoxylated soya acids*

A high pressure rocking autoclave was charged with 400 parts of the acrylonitrile adduct of polyethoxylated soya acids from Example I and 8 parts of Raney nickel (dispersed in 5 parts beta-octadecyloxy propionitrile). After the apparatus was flushed three times with hydrogen to remove the air from the gas space, the hydrogenation was carried out at 100° C. under a pressure of 1000 p.s.i. for 3.2 hours with an ammonia partial pressure of 130 p.s.i. The product was filtered to remove the nickel catalyst and sparged with nitrogen at 95° C. under reduced pressure to remove the dissolved ammonia. Analysis of the product: percent primary amine N, 2.59 (calculated, 2.45); iodine value, 47.2.

EXAMPLE VII

*Amine of polyethoxylated aliphatic and rosin free tall oil acids*

To 309.5 parts of the acrylonitrile adduct of polyethoxylated tall oil acids having an average of 12 ethylene oxide units per mole (from Example II) were added 12.5 parts of Raney nickel dispersed in 8.3 parts of beta octadecyloxy propionitrile. No solvent was present. An ammonia partial pressure of 130 p.s.i. and a total pressure of ammonia and hydrogen of 1000 p.s.i. were employed. After 6 hours at 100° C., the product was removed and freed of catalyst and dissolved ammonia. Analysis of product: percent primary amine N, 1.61 (calculated, 1.81). The primary amine nitrogen analysis indicated that the product contained 89% of the desired material.

EXAMPLE VIII

*Amine of polyethoxylated mixture of stearic acid and palmitic acid*

To 250 parts of the acrylonitrile adduct of the polyethoxylated mixture of stearic and palmitic acids containing an average of 12 ethylene oxide units per mole (from Example III) dissolved in 250 parts of absolute ethanol were added 7.5 parts of Raney nickel dispersed in 5 parts of beta octadecyloxy propionitrile. After the air had been flushed out of the hydrogenation autoclave, ammonia was introduced to a pressure of 130 p.s.i. followed by hydrogen to a total pressure of 1100 p.s.i. The hydrogenation was carried out at 100° C. for 12 hours with the pressure varying from 1050 to 1200 p.s.i. The catalyst and ammonia were removed as in the previous experiment and the ethanol was distilled off at reduced pressure and temperatures to 100° C. Analysis of the products, percent primary amine N, 1.76 (calculated, 1.79).

EXAMPLE IX

*Amine of polypropoxylated linseed acids*

To 232 parts linseed acids containing 5 units of propylene oxide and dissolved in 300 parts toluene was added 20 parts Raney nickel. The Raney nickel was washed three times with ethanol to romove the water and three times with toluene to remove the ethanol. This mixture was charged in a rocking autoclave, the air removed and the space flushed with hydrogen several times. Thereafter ammonia was introduced to a pressure of 130 p.s.i. and hydrogen added to make a total pressure of 1400 p.s.i. The reaction was carried out for a period of 7 hours at about 100° C. to 130° C. The reaction product was filtered to remove the catalyst and sparged with nitrogen under reduced pressure to remove dissolved ammonia the solvent was distilled off. The product analyzed 1.37% nitrogen and 1.32% amine nitrogen.

EXAMPLE X

*Amine of polypropoxylated soya acid*

To 232 parts of acrylonitrile adduct of soya acids containing 5 units of propylene oxide dissolved in 300 parts toluene were added 20 parts Raney nickel, treated as indicated in the above example. This mixture was added to a suitable autoclave, the air removed and the space flushed several times with hydrogen. Thereafter ammonia was added to produce a pressure of 130 p.s.i. and then hydrogen to a total pressure of 1650 p.s.i. The reaction was carried out for a period of 7 hours at between 113° C. to 124° C., after which the reaction mixture was filtered to remove the catalyst and the toluene was distilled off. The product analyzed .93% nitrogen and 0.77% amine nitrogen.

The physical properties of the polyoxyalkylated nitriles and amines are dependent upon the structure of the radicals

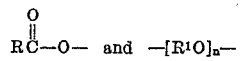

and $n$ in the basic Formulae, I and II. They can vary from liquids to viscous liquids to solids. Where R is saturated the tendency is to a solid form. If they are adducts of ethylene oxide, the solid structure is favored for both a saturated and unsaturated R, and the hardness increases with increasing $n$. Propoxylated products favor the liquid phase as do the mixed polyoxyalkylated products.

Solubility is also related to the structure. Products derived from ethylene oxide become increasingly water soluble when $n$ is greater than 5. Propylene and butylene oxide derivatives are less water soluble but more oil soluble than the former. Obviously, by varying the structure and size of the several radicals a wide variety of properties is possible. Thus, the amines produced have improved water and oil soluble properties as described above.

These products are useful in detergent compositions, as emulsifiers, ore flotation agents, in the preparation of anti-corrosion agents, anti-static agents, quaternaries, pigment wetting agents, anti-stripping and bonding agents in asphalt paving mixtures, adhesion coating improvers, cationic surface active agents, dye assistants, water soluble freezing point depressants, polymerizable and chemical intermediates, and other applications. Insofar as it can be determined, the compounds disclosed herein have not heretofore been prepared and are unknown to the art.

In accordance with the patent statutes, I have described and illustrated a number of exemplary embodiments of my new and useful compounds and the process for preparing the same. The examples are given by way of exemplification for substituting components therein, as described, limited only by the terms of the appended claims.

I claim:

1. A polyoxyalkylated aliphatic propionitrile having the emperical structure

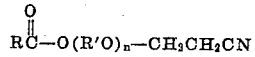

where R is a non-conjugated fatty acid radical containing 5 to 23 carbon atoms, R' is an alkyl radical of 2 to 4 carbon atoms and $n$ is an integer of 2 to 30.

2. A polyoxyalkylated aliphatic primary amine having the basic structure

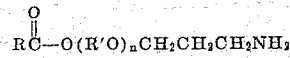

where R is a non-conjugated fatty acid containing 5 to 23 carbon atoms, R' is an alkyl radical of 2 to 4 carbon atoms and $n$ is an integer of 2 to 30.

3. A polyoxyalkylated aliphatic propionitrile having the empirical structure

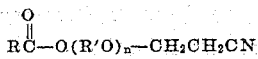

where R is a non-conjugated fatty acid radical containing about 18 carbon atoms, R' is an alkyl radical of 2 to 4 carbon atoms and $n$ is an integer of 2 to 30.

4. A polyoxyalkylated aliphatic primary amine having the basic structure

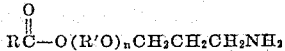

where R is a non-conjugated fatty acid radical containing about 18 carbon atoms, R' is an alkyl radical of 2 to 4 carbon atoms and $n$ is an integer of 2 to 30.

5. A polyoxyalkylated aliphatic propionitrile having the empirical structure

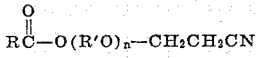

where R is a derivative of aliphatic tall oil acids, R' is an alkyl group of 2 to 4 carbon atoms and $n$ is an integer of 2 to 30.

6. A polyoxyalkylated aliphatic primary amine having the basic structure

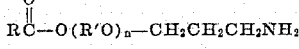

where R is a derivative of aliphatic tall oil acids, R' is an alkyl group 2 to 4 carbon atoms and $n$ is an integer of 2 to 30.

7. A polyoxyalkylated aliphatic propionitrile having the empirical structure

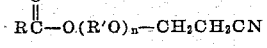

where R is a derivative of linseed oil fatty acids, R' is an alkyl group of 2 to 4 carbon atoms and $n$ is an integer of 2 to 30.

8. A polyoxyalkylated aliphatic primary amine having the basic structure

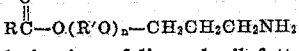

where R is a derivative of linseed oil fatty acids, R' is an alkyl group of 2 to 4 carbon atoms and $n$ is an integer of 2 to 30.

9. A polyoxyalkylated aliphatic propionitrile having the empirical structure

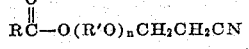

where R is a derivative of soya fatty acids, R' is an alkyl radical of 2 to 4 carbon atoms and $n$ is an integer of 2 to 30.

10. A polyoxyalkylated aliphatic primary amine having the empirical structure

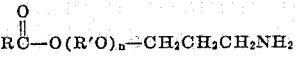

where R is a derivative of soya fatty acids, R' is an alkyl radical of 2 to 4 carbon atoms and $n$ is an integer of 2 to 30.

11. In the process of preparing a polyoxyalkylated fatty nitrile having the emperical structure

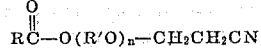

where R is a fatty chain of 5 to 23 carbon atoms, R' is an alkyl radical of 2 to 4 carbon atoms and $n$ is an integer of 2 to 30, the steps comprising mixing a polyalkoxylated fatty acid of 6 to 24 carbon atoms in the fatty radical, a chemically equivalent amount to an excess of about 200% acrylonitrile and from about 0.01 to 5 grams strong base cyanoethylation catalyst per mole of the said polyalkoxylated fatty acid and from 0 to 500 parts inert solvent, heating the mixture between about 30° C. and about 60° C. and below the reflux temperature of the acrylonitrile in the given mixture, and effecting the production of the said polyalkoxylated fatty nitrile.

References Cited in the file of this patent
UNITED STATES PATENTS 2,380,061 Mowry _____ July 10, 1945
2,440,140 Bruson et al. _____ Apr. 20, 1948

OTHER REFERENCES

Degering, Organic Nitrogen Compounds, pages 203–204 (1945), University Lithoprinters, Ypsilanti, Mich.